United States Patent [19]
Toya et al.

[11] Patent Number: 6,040,680
[45] Date of Patent: Mar. 21, 2000

[54] RECHARGEABLE BATTERY PACK AND CHARGING STAND FOR CHARGING THE RECHARGEABLE BATTERY PACK BY ELECTROMAGNETIC INDUCTION

[75] Inventors: Shoichi Toya, Mihara-gun; Toshiharu Kokuga, Tsuna-gun, both of Japan

[73] Assignee: Sanyo Electric Co., Ltd., Moriguchi, Japan

[21] Appl. No.: 09/118,853

[22] Filed: Jul. 20, 1998

[30] Foreign Application Priority Data

Jul. 22, 1997 [JP] Japan .................................. 9-195643

[51] Int. Cl.[7] .................................................. H01M 10/46
[52] U.S. Cl. ........................................... 320/108; 320/112
[58] Field of Search .................................. 320/106, 108, 320/110, 112; 336/DIG. 2

[56] References Cited

U.S. PATENT DOCUMENTS

| | | | |
|---|---|---|---|
| 3,414,796 | 12/1968 | Henquet | 320/108 |
| 3,885,211 | 5/1975 | Gutai | 320/108 |
| 4,031,449 | 6/1977 | Trombly | 320/108 |
| 4,912,391 | 3/1990 | Meadows | 320/108 |
| 4,942,352 | 7/1990 | Sano | 320/108 |
| 5,550,452 | 8/1996 | Shirai et al. | 320/108 |
| 5,734,254 | 3/1998 | Stephens | 320/106 |

*Primary Examiner*—Edward H. Tso
*Attorney, Agent, or Firm*—Wenderoth, Lind & Ponack, L.L.P.

[57] ABSTRACT

A battery pack having at least one rechargeable battery and a secondary coil, which is electromagnetically coupled to a primary coil contained inside of a charging stand. The battery pack also includes a control circuit which controls electric power induced in the secondary coil for charging the rechargeable batteries. The secondary coil of the battery pack is positioned close to the bottom of a battery pack case with its center axis oriented along the elongated direction of the case. The charging stand contains the primary coil, which is located so as to be close to the secondary coil when the battery pack is mounted on the charging stand.

15 Claims, 6 Drawing Sheets

RECHARGEABLE BATTERY PACK AND CHARGING STAND FOR CHARGING THE RECHARGEABLE BATTERY PACK BY ELECTROMAGNETIC INDUCTION

This application is based on application No. 9-195643 filed in Japan on Jul. 22, 1997, the content of which is incorporated herein by reference.

BACKGROUND OF THE INVENTION

The present invention relates to a battery pack and charging stand for charging the battery pack. More specifically, this invention relates to a battery pack and charging stand for charging the battery pack without electrical contacts for battery charging whereby electrical power is transmitted by the action of electromagnetic induction caused by locating a primary coil and a secondary coil in close proximity.

The battery pack can be charged when attached to a portable electrical device by, for example, charging terminals exposed from the bottom surface of the attached battery pack. On the other hand, discharging terminals of the battery pack, which serve to connect the battery pack and the portable electrical device, are internal to the portable electrical device with the battery pack attached. However, when the portable electrical device is attached to a charging stand, the charging terminals must make electrical contact with the supply terminals on the charging stand. Therefore, it is necessary to position the charging terminals where they will always be exposed. Especially, the battery pack, which is attached to the portable electrical device which mounts on the charging stand, requires the charging terminals to be in a position where they will be exposed outside even in the condition where it is attached to portable electrical device. For this reason, the charging terminals of the battery pack can be exposed to extremely dirty environments, and this system has the disadvantage that electrical contact problems can easily occur when attached to the charging stand.

In particular, for charging stands to discriminate between battery pack types and optimize charging conditions, multiple charging terminals have become common. It is difficult to attach a multiple charging terminal battery pack to a charging stand without developing contact problems on any of the charging terminals. Detrimental effects such as degraded rechargeable battery performance can occur due to charging without good contact at all of the charging terminals. For example, if the type of rechargeable battery contained in the battery pack is mistaken and charging is performed with large currents, or if charging is performed without correct battery temperature readings, degradation of battery performance can occur.

As noted, battery pack charging terminals are exposed when the known battery pack is connected to the portable electrical device. Therefore, when the portable electrical device is transported in a pocket or a carrying bag, problems such as short circuits can develop due to contact with the charging terminals and metallic objects or chains, which are also transported in the pocket or bag.

To solve these problems, a battery pack, which attaches to the portable electrical device and has rechargeable batteries that are charged by electrical power supplied from the portable electrical device without using exposed contacts, has been developed. This type of the battery pack is not directly charged by the charging stand but rather is charged via the portable electrical device. The portable electrical device comprises a secondary coil housed therein and the charging stand comprises a primary coil which is electromagnetically coupled with the secondary coil. Electrical power is transmitted by electromagnetic induction from the primary coil of the charging stand to the secondary coil of the portable electrical device. The portable electrical device rectifies the alternating current (AC) induced in the secondary coil and converts it into direct current (DC). This DC power is controlled by a control circuit and supplied to the battery pack to charge the rechargeable batteries. The battery pack and portable electrical device are connected by charge-discharge terminals. The portable electrical device is attached to the charging stand when charging the battery pack. In this condition, electrical power is supplied from the primary coil of the charging stand to the secondary coil of the portable electrical device, and the output of the secondary coil is controlled by the control circuit. Then electrical power is supplied from the portable electrical device to the battery pack. When the portable electrical device is detached from the charging stand, electrical power is then supplied from the battery pack to the portable electrical device and the portable electrical device can be used.

According to this method, the battery pack charged by the portable electrical device does not need to have exposed charging terminals, nor does it require the portable electrical device to be connected to the charging stand via contact points in the condition in which the battery pack is attached to the portable electrical device. Therefore, this type of battery pack has the advantage that the portable electrical device is attached to the charging stand and the battery pack can be charged without any contacts. However, the battery pack cannot be charged when it is detached from the portable electrical device. For this reason, there is a disadvantage in that any spare battery pack cannot be attached to and charged by the charging stand while the portable electrical device is in use.

Further, the battery pack with this structure may be connected to and charged by the portable electrical device via control signal terminals, in addition to charge-discharge terminals such as positive or negative terminals. This battery pack cannot be charged correctly if the electrical contact of the control signal terminals are poor. In this case, charging will not be achieved safely or may charge the batteries in a manner which results in significant battery degradation. This is because a charging circuit housed in the portable electrical device cannot correctly determine the type or condition of the battery pack during charging.

Furthermore, the method of charging the battery pack by transmitting electrical power from the charging stand to the portable electrical device by electromagnetic induction may pose another problem in that it is difficult to position the secondary coil in an appropriate position within the portable electrical device. It especially gets difficult for the portable electrical device, which has the battery pack at its back, to position the secondary coil in the appropriate position. This is because the bottom part of the case of the portable electrical device is very thin where it is appropriate to position the secondary coil.

SUMMARY OF THE INVENTION

This invention was developed to solve these types of problems. Thus it is a primary object of the present invention to provide a battery pack and charging stand which can charge rechargeable batteries in which no charging terminal is provided for the battery pack.

Further, it is another important object of the present invention to provide a battery pack which eliminates improper charging caused by poor electrical contact, and which safely charges the rechargeable batteries contained inside under ideal conditions without battery performance degradation.

Furthermore, another important object of the present invention is to provide a battery pack and charging stand which can transfer electrical power from the primary coil to secondary coil with good efficiency by positioning the secondary coil in the most appropriate position in the battery pack.

The battery pack and charging stand of the present invention have a primary coil and a secondary coil. The secondary coil is contained inside of the battery pack and the primary coil is contained inside of the charging stand such that electrical power is transmitted from a primary coil to a secondary coil by electromagnetic induction. The battery pack is attached to the charging stand directly or via a portable electrical device which is powered by the battery pack, and a rechargeable battery contained inside of the battery pack is charged. The battery pack comprises the secondary coil, which is electromagnetically coupled with the primary coil, and a control circuit which controls electrical power induced in the secondary coil and charges the rechargeable batteries.

The secondary coil is positioned close to the bottom surface of a battery pack case with the center axis of the coil oriented in the elongated direction of the elongated case. The charging stand houses the primary coil at a position which is closest to the secondary coil. The primary coil of the charging stand transfers power by electromagnetic induction to the secondary coil, then the control circuit controls electrical power induced in the secondary coil and charges the rechargeable batteries of the battery pack.

The battery pack and charging stand having this structure allows no-contact-charging forth battery pack without providing charging terminals on the battery pack, which is attached to the portable electrical device. This is because the battery pack of the present invention provides both the secondary coil and the control circuit, and the charging stand provides the primary coil such that the rechargeable batteries are charged by electrical power transmitted from the primary coil to the secondary coil of the battery pack by electromagnetic induction. Namely, the battery pack need not be charged by electrical power supplied from the portable electrical device, but rather it can be charged by electrical power induced in the built-in secondary coil, which is controlled by the control circuit. Therefore, the battery pack does not need to be connected via contact points of the portable electrical device in order to be charged. Instead, the battery pack can be fully charged by the built-in control circuit which monitors the charging status of the rechargeable battery. The battery pack, which is charged under these conditions, does not require charging terminals connected to the portable electrical device nor the charging stand. Nor does it require terminals for detection of the type and condition of the battery being charged. The battery pack can be charged under ideal conditions without any contact point.

Further, the battery pack and charging stand of the present invention realizes the charging for the battery pack from the charging stand directly not via the portable electrical device under the condition which requires no contact points but applies the action of electromagnetic induction. The battery pack being charged under these conditions has the advantage that it can be charged by the charging stand without the portable electrical device. Consequently, if necessary, the battery pack can also be charged by direct connection to the charging stand without attachment to portable electrical device. This system configuration achieves added convenience in that a spare battery pack can be charged by the charging stand while the portable electrical device is in use.

Furthermore, the battery pack and charging stand of the present invention also realizes the feature that abnormal battery charging caused by poor charging terminal contact is eliminated, and rechargeable batteries can be charged safely under ideal conditions and without battery performance degradation. This is because the battery pack contains both a secondary coil and a control circuit, and electric power is magnetically induced in the secondary coil and controlled by the control circuit to charge the rechargeable batteries.

The battery pack of the present invention has still another advantage in that it can be charged with good efficiency for transmission of electrical power from the primary coil to the secondary coil by locating it in an ideal position. This is because the battery pack of the present invention has the configuration in which the secondary coil is placed close to the bottom surface of the battery pack case with the central axis of the secondary coil located in the elongated direction of the elongated case.

The secondary coil, which is positioned near the bottom surface of the case, can be located close to the primary coil contained inside the charging stand. Especially, regardless of the shape of the portable electrical device, the secondary coil is located near the bottom of the battery pack in close proximity to the primary coil of the charging stand, and thus the secondary coil can be efficiently charged.

The above and further features of the invention will be more fully apparent from the following detailed description and accompanying drawings.

DETAILED DESCRIPTION OF THE INVENTION

Figure 1:
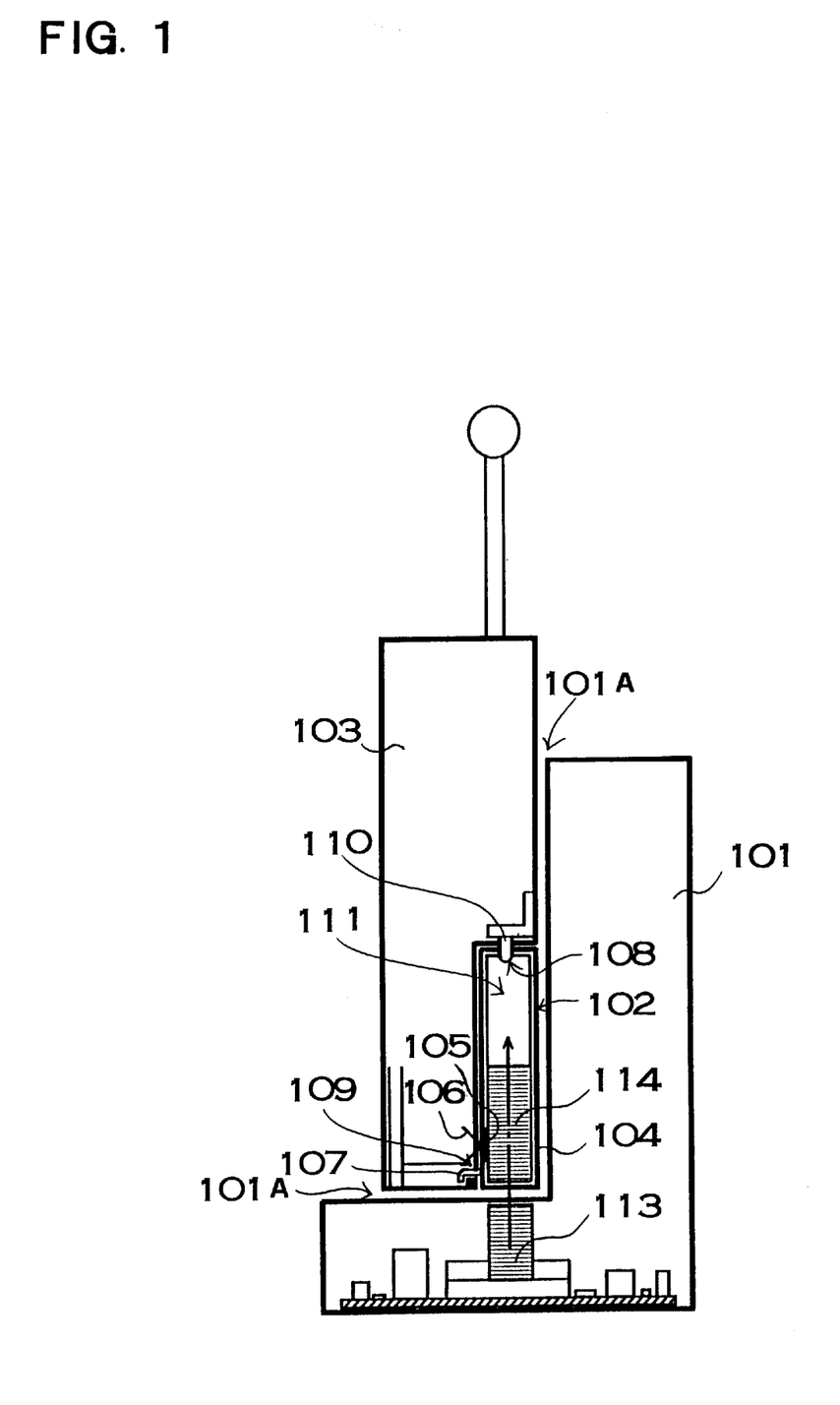
FIG. 1 is a cross-sectional view of a portable electrical device attached to a battery pack and a charging stand in accordance with an embodiment of the present invention.

FIG. 1 shows a charging stand 101 and a battery pack 102 which comprises a rechargeable battery 111. The battery pack 102 is attached at the back of a portable electrical equipment or device 103 in a removable fashion and is attached to the charging stand 101 via the portable electrical device 103. The charging stand 101 comprises an attachment section 1 01A at which the portable electrical device 103 is connected to the battery pack 102.

The portable electrical device 103 shown in FIG. 1 is a mobile telephone, however the present invention does not restrict the portable electrical device to mobile telephones.

For example, the portable electrical device may also be an electric shaver or an electric toothbrush and the like.

The battery pack 102 supplies electrical power to the portable electrical device 103. Therefore, the battery pack 102 has discharge terminals 105 that are exposed outside of its case 104. The portable electrical device 103 has power supply terminals 106 which contact and make an electrical connection with the discharge terminals 15 when the battery pack 102 is attached. The battery pack 102, shown in FIG. 1, has discharge terminals 105 which are exposed from a surface which mates with an attachment plane of the portable electrical device 103. The discharge terminals 105 contact the power supply terminals 105 of the portable electrical device 103 when the battery pack 102 is attached to the portable electrical device 103.

The battery pack 102 is also provided with locking projections 17 at the bottom edge of the case 104 and locking detents 108 at the top edge of the case 104. The locking projections 107 are inserted into locking locations or openings 109 provided in the case 104 of the portable electrical device 103. Locking pieces 110 are provided on the portable electrical device 103 and are received into the locking detents 108 in a flexible fashion. This construction of battery pack 102 is attached and detached to and from the portable electrical device 103 by moving the locking pieces 110 upward. The locking pieces 110 are resiliently inserted into the locking detents 108 and function to attach the battery pack 102 to the portable electrical device 103 in a manner that keeps it from falling off. This construction of battery pack 102 can be easily attached and detached to and from the portable electrical device 103 by operation of the locking pieces 110. However, the present invention does not restrict the battery pack and portable electrical device attachment arrangement to that described above, and any arrangement which allows the battery pack to be freely attached and detached to and from the portable electrical device can be employed.

The battery pack 102 is not provided with charging terminals, and thus the rechargeable batteries 111 are charged with electric power transmitted from the charging stand 110 by the action of magnetic induction. To transfer electric power by magnetic induction, the charging stand 101 contains a primary coil 113 and the battery pack 102 contains a secondary coil 114. The primary coil 113 and the secondary coil 114 are magnetically coupled, and electric power is transferred from the primary coil 113 to the secondary coil 114. To efficiently transmit power from the primary coil 113 to the secondary coil 114, the two coils 113 and 114 are positioned as close to each other as possible.

Figure 4:
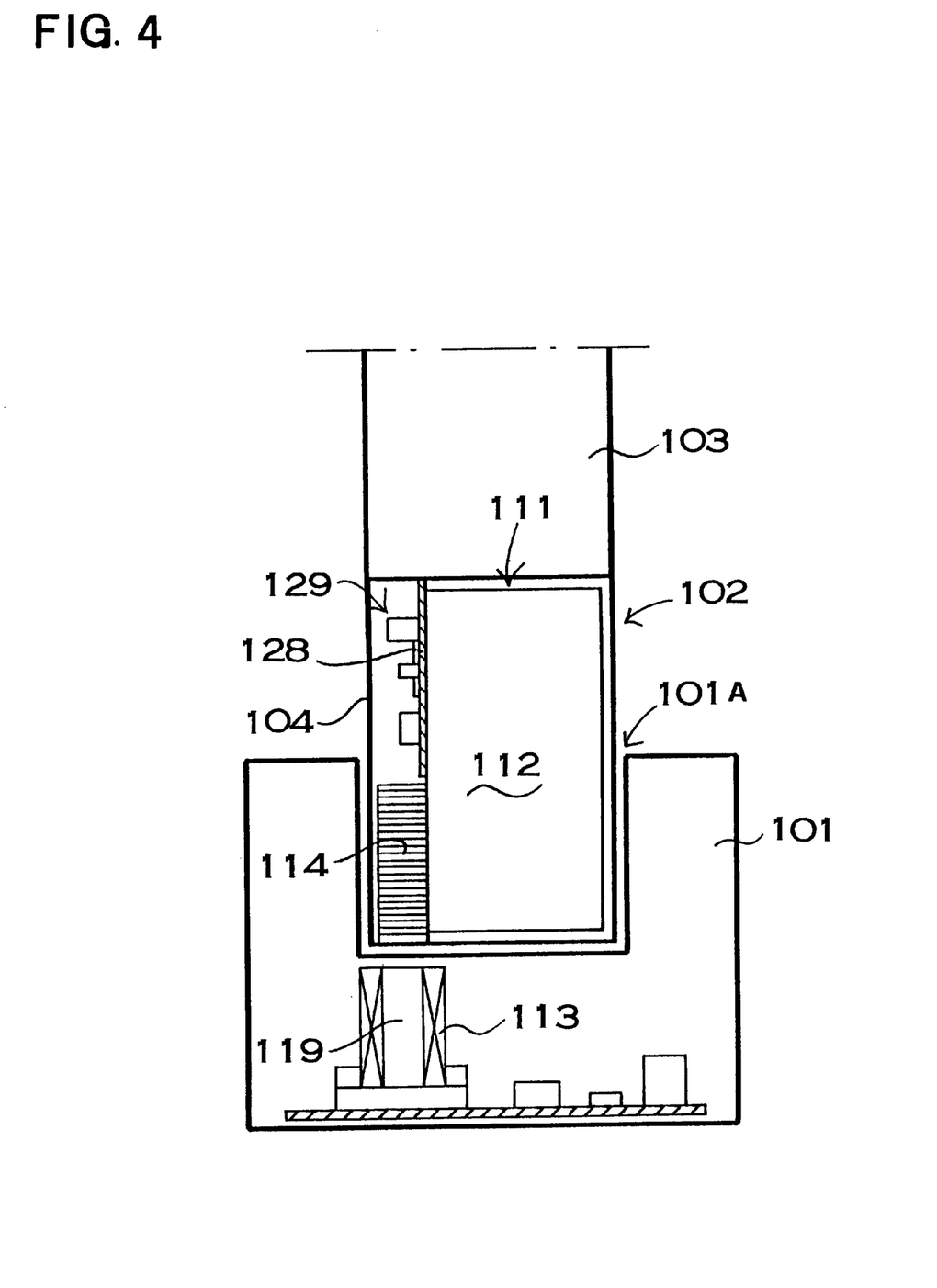
FIG. 4 is a vertical cross-sectional view of the battery pack and charging stand shown in FIG. 1.

The primary coil 113 is disposed on an inside surface of the attachment plane of the charging stand 101. As shown in the circuit diagram of FIG. 2, the primary coil 113 is connected to a power supply circuit 115. The power supply circuit 115 is provided with a rectifying circuit 116 which converts to the input commercial AC power to DC with diodes and into smoothed DC with a smoothing capacitor, a switching device 117 which is a field effect transistor (FET) connected in series with the primary coil 113, and an oscillator circuit 118 which turns the switching device 117 on and off. The oscillator circuit 118 turns the switching device 117 on and off at frequencies, for example, of 50 kHz to 500 kHz, and preferably about 100 kHz. The switching device 117 switches the DC output from the rectifying circuit 116 to excite the primary coil 113 with AC power. As shown in FIG. 4, the primary coil 113 has a ferrite core 119 disposed at its center to efficiently transfer power to the secondary coil 114 by electromagnetic induction.

Figure 2:
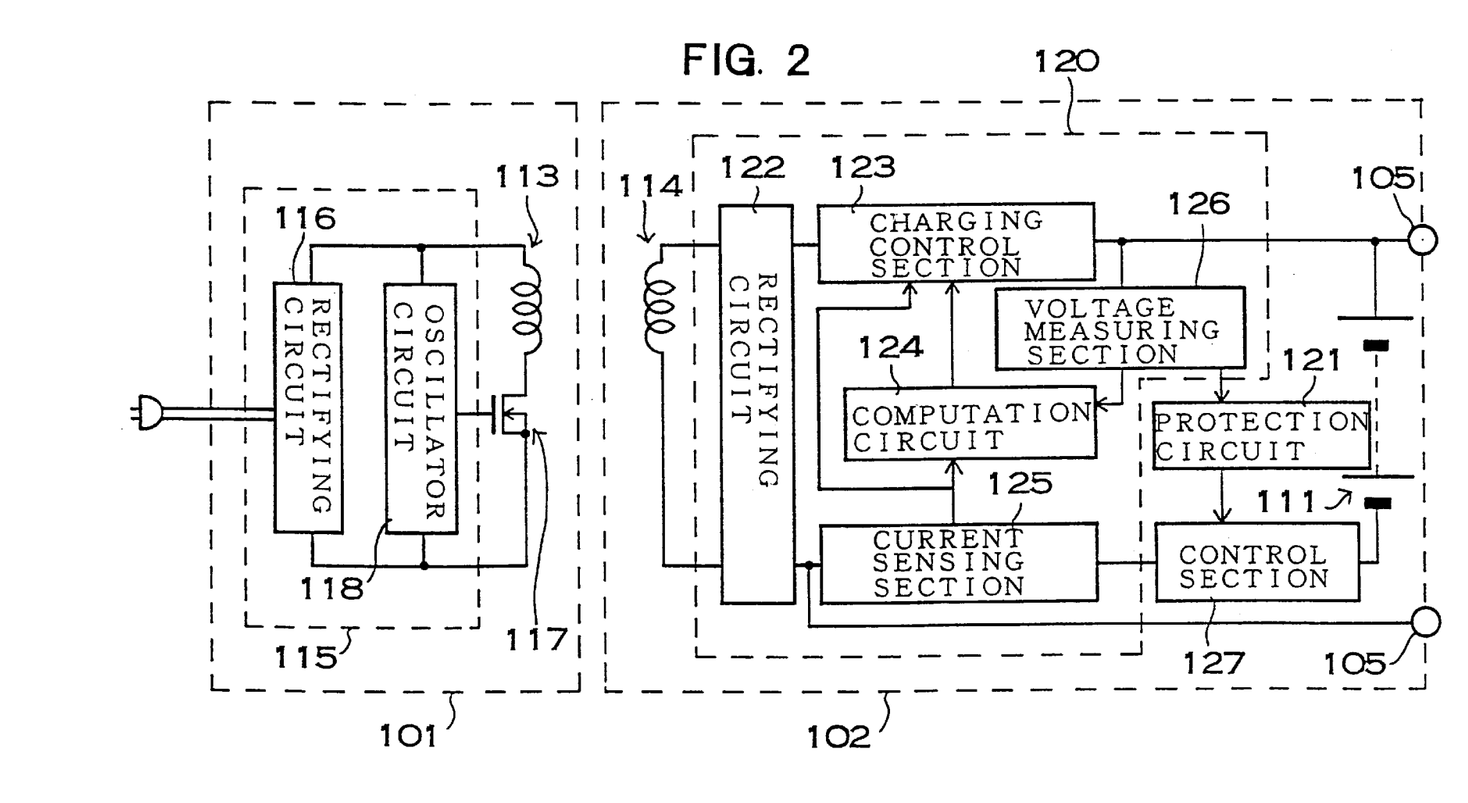
FIG. 2 is a circuit diagram of the battery pack and the charging stand of an embodiment of the present invention.

The battery pack 102 contains rechargeable batteries 111, a secondary coil 114 magnetically coupled to the primary coil 113 of the charging stand 101, a control circuit 120 which converts secondary coil 114 AC output to DC and controls the charging state of the rechargeable batteries 111, and a protection circuit 121 which cuts off current and protects the batteries when they are used under abnormal conditions.

The battery pack 102 preferably contains lithium ion batteries as the rechargeable batteries 111. A lithium ion battery pack is light weight and has a large charge capacity, However, nickel hydrogen batteries or nickel cadmium batteries may also be used as the rechargeable batteries housed in the battery pack. They are characterized in that nickel cadmium batteries can discharge large currents and nickel hydrogen batteries have a large charge capacity per volume.

As shown in FIG. 1, the secondary coil 114 is positioned on an inside surface of the battery pack case 104 at the back side of the battery pack 102 in opposition to the primary coil 113 so as to locate it close to the primary coil 113 when the portable electrical device 103 is attached to the charging stand 101. To keep the battery pack 102 light weight, no core is provided for the secondary coil 114 so it has an air-core. However, a core may also be provided for the secondary coil for efficient power transmission by electromagnetic induction from the primary coil 113 to the secondary coil 114.

As shown in the circuit diagram of FIG. 2, the control circuit 120 comprises a rectifying circuit 122 for rectifying and converting AC output induced by the secondary coil 114 to DC. The control circuit also includes a charging control section 123 connected in series between the rectifying circuit 122 output and the rechargeable batteries 111 to control the charging state of the rechargeable batteries 111, a computation circuit 124 to control the charging control section 123, a current sensing section 125 to input rechargeable battery 111 charging current to the computation circuit 124, and a voltage measuring circuit 126 to input the voltage to the computation circuit 124.

The charging control section 123 controls output of the rectifying circuit 122 to voltage and current levels suitable for charging the rechargeable battery 111, and also stops charging when the rechargeable batteries 111 have reached full charge. Therefore, the charging control section 123 comprises a constant current constant voltage circuit to stabilize output from the rectifying circuit 122, and a switching device to stop charging when the rechargeable batteries 111 reach full charge under control of the computation circuit 124. The constant current constant voltage circuit measures charging current and battery voltage to control the output to a constant current and constant voltage. The switching device is connected in series with the rechargeable batteries 111. The rechargeable batteries 111 are charged when the switching device is on and charging is stopped when the switching device is off.

The computation circuit 124 measures charging current and battery voltage of the rechargeable batteries 111, and controls the switching device of the charging control section 123. The computation circuit 124 maintains the switching device in the ON state until the rechargeable batteries 111 reach full charge, and at that point the computation circuit 124 switches the switching device OFF to stop charging. Full charge of a lithium ion rechargeable battery can be detected by measuring charging current or battery voltage. A lithium ion rechargeable battery is charged to full charge initially by constant current charging and subsequently by constant voltage charging. During the constant voltage charging step, charging current gradually decreases as full battery charge is approached. Consequently, full battery charge can be determined by detecting when charging current drops below a specified value, and charging can be stopped at that point. Full battery charge can also be determined when battery voltage rises to a specified voltage, and charging can be stopped at that point.

Nickel-hydrogen and nickel-cadmium batteries are charged to full charge with constant current charging. These battery types have the property that battery voltage drops slightly as full battery charge is reached. Consequently, full battery charge can be determined by detecting a drop in battery voltage, namely DV.

The protection circuit 121 measures battery voltage and current flowing in the batteries to control, i.e., turn ON and OFF, a switching device of the control section 127. If battery voltage becomes greater than a specified voltage, or less than a specified voltage, the protection circuit 121 turns the switching device of the control section 127 OFF to cut-off battery current. In addition, when abnormally large currents flow in the batteries, the switching device is also turned off to cut-off battery current.

The battery pack 102 shown in FIG. 2 has a separate control circuit 120 and protection circuit 121. However, the capabilities of the protection circuit may also be included in the computation circuit of the control circuit thereby allowing the control circuit to serve a dual function as a protection circuit. In addition, the switching device of the charging control section may also serve a dual function as the switching device controlled by the protection circuit. The computation circuit may be realized by analog circuitry to process analog signals such as voltages and currents and control the switching device, or it may be a microprocessor such as a one-chip microcomputer (or micro-controller). A microprocessor computation circuit converts voltages and currents to digital signals for computation with an analog to digital (A/D) converter.

Figure 3:
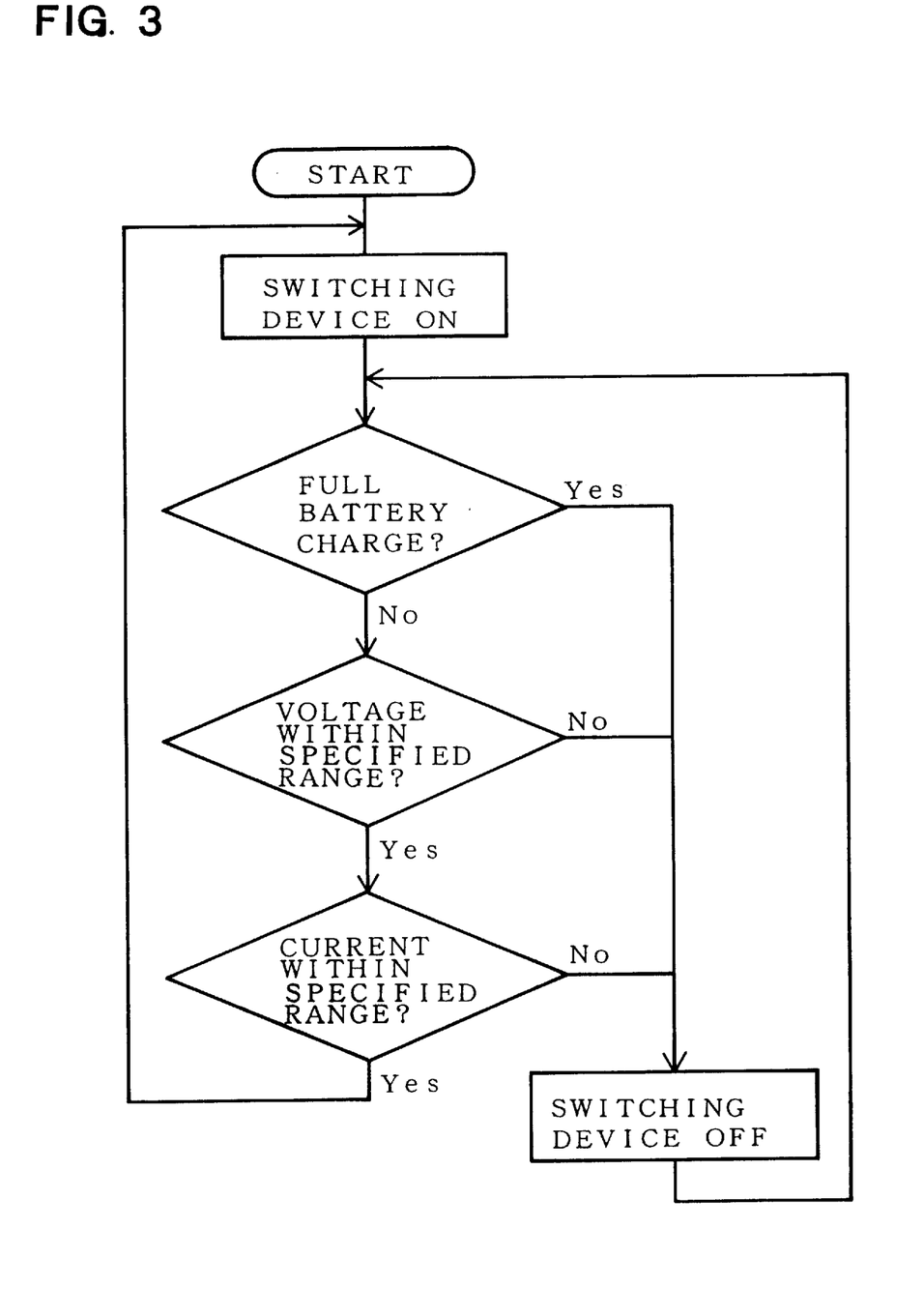
FIG. 3 is a flow-chart for a microprocessor computation circuit combining a control circuit and a protection circuit for another embodiment of the present invention.

A microprocessor computation circuit serving as both control circuit and protection circuit controls the switching device as shown in the flow-chart of FIG. 3. Turning to the flow-chart of FIG. 3, the microprocessor controls the switching device ON only when the rechargeable batteries are not fully charged and battery voltage and current are within the specified range. The microprocessor controls the switching device OFF when either the batteries have reached full charge, or battery voltage or current are outside the specified range.

FIG. 4 is a cross-sectional view in which a portable electrical device 103 is attached to the charging stand 101 as seen from the back side. The battery pack 102 shown in FIG. 4 comprises a cylindrically wound secondary coil 114. The secondary coil 114 is disposed at the bottom of the case 104 with its center axis oriented in the long direction of the case 104 and the battery, which is the vertical direction in FIG. 4. The case 104 is rectangular shaped thin plastic and contains the rectangular rechargeable battery 111 inside thereof. The rectangular battery is thin and flat. The width of the rectangular case 104 is wider than the rectangular battery so that a gap is defined between the side of the rectangular case 104 and rectangular battery. The secondary coil 114 is disposed in the gap between the case 104 and the rechargeable battery 111. The secondary coil 114 is provided on the bottom surface of the case 104, and a printed circuit board 128 is provided above the secondary coil 114.

The printed circuit board 128 is thin and elongated with substantially the same width as the thickness of the rectangular battery. The printed circuit board 128 is provided at the side of the rectangular battery and is insulated from the batteries. The printed circuit board 128 comprises electronic parts or components 129 which constitute the control circuit and the protection circuit thereon.

Figure 5:
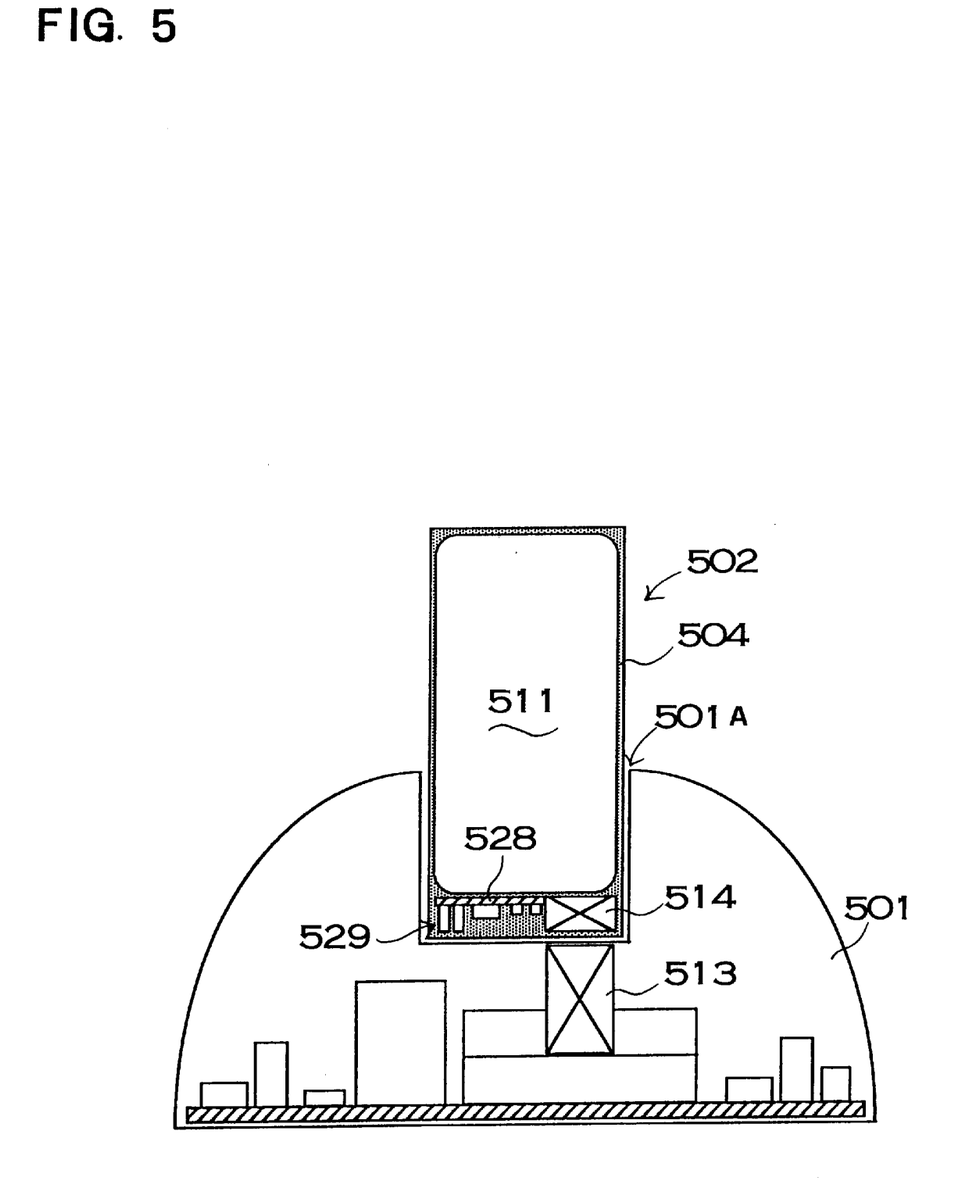
FIG. 5 is a cross-sectional view of a battery pack and charging stand of another embodiment of the present invention.

Furthermore, the battery pack 502, shown in FIG. 5, comprises a rectangular case 504 which houses a rectangular rechargeable battery 511. The overall length of the rectangular case 504 is longer than that of the rectangular battery so that a gap is defined at the bottom of the rectangular case 504. The secondary coil 514 and the printed circuit board 528 are provided in the gap. As shown in FIG. 5, battery pack 502 comprises a secondary coil 514 provided in the right side of the gap and a printed circuit board 528 provided in the left side of the gap. The battery pack, shown in FIG. 5, has the same construction as the battery pack of FIG. 4 in order to be attached to and detached from a portable electrical device.

Figure 6:
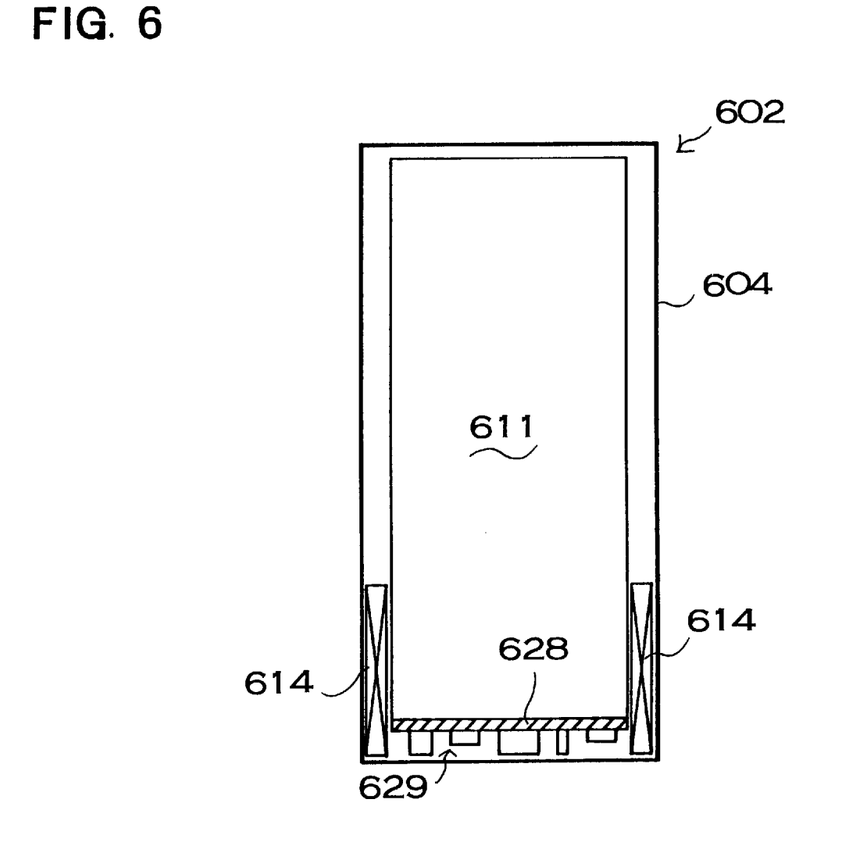
FIG. 6 is a cross-sectional view of a battery pack of still another embodiment of the present invention.

The battery pack 602 shown in FIG. 6 also comprises a rectangular case 604 which houses a rectangular rechargeable battery 611. The interior dimension of the rectangular case 604 is larger than the outer dimension of the rectangular battery so that a gap is defined between the circumference of the rechargeable battery 611 and the case 604. A secondary coil 614 is provide in this gap. The secondary coil 614 is wound in a square tubular shape in order to allow it to be inserted into the bottom portion of the rectangular battery. A printed circuit board 628 is provided inside the secondary coil 614 at the bottom portion of the case 604. The battery pack 602 of this structure allows a larger winding diameter of the secondary coil 614.

Figure 7:
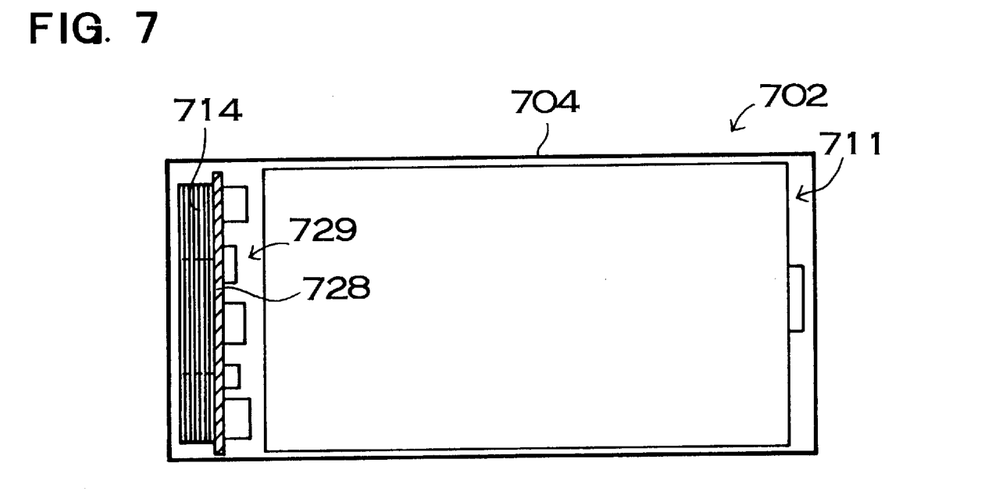
FIG. 7 is a cross-sectional view of a battery pack of still another embodiment of the present invention.

Furthermore, the battery pack 702, as shown in FIG. 7, comprises a cylindrical case 704 which houses a cylindrical rechargeable battery 711. This battery pack 502 comprises a printed circuit board 728, which has approximately the same outline or shape as the cylindrical rechargeable battery 711, which is disposed at the end of the battery. The printed circuit board 728 has electrical parts or components 728 forming the circuitry such as the control circuit and the like. The components 729 are attached to the side of the printed circuit board facing the battery. Also, a coiled secondary coil 714 is attached to the bottom side of the battery pack 702. The battery pack 702 has the feature that the secondary coil 714, which is wound in a circular shape, can be contained within the battery pack 702 without wasting any space.

The battery pack 702 is inserted into the cylindrical insertion section (not illustrated) provided at the bottom of the portable electrical device such that it is attached to the portable electrical device and it can be charged via the portable electrical device when it is mounted on the charging stand.

The battery packs, shown in FIGS. 4 to 7, are attached to the portable electrical devices, then they are charged when the portable electrical devices are mounted on the charging stands. However, the above mentioned battery packs may also be charged directly by the charging stands, and not via the portable electrical equipment.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A battery pack comprising:

a rectangular-shaped casing having a rectangular bottom face;

at least one rectangular rechargeable battery disposed within said casing, wherein a width of said casing is greater than a width of said rectangular rechargeable battery such that a gap is defined between a side face of said casing and an opposing side face of said rectangular rechargeable battery;

a secondary coil disposed in said gap and in close proximity to said bottom face of said casing, said secondary coil having a central axis that is oriented in an elongated direction of said casing; and a control circuit for controlling electric power induced in said secondary coil for charging said rectangular rechargeable battery contained in said casing.

2. A battery pack as claimed in claim 1, wherein said control circuit is disposed in the gap defined between the side face of said casing and the opposing side face of said rectangular rechargeable battery.

3. A battery pack comprising:

a rectangular-shaped casing having a bottom face;

at least one rectangular rechargeable battery disposed within said casing, wherein a length of said casing is greater than a length of said rectangular rechargeable battery in order to define a gap between the bottom face of said casing and an opposing lower face of said rectangular rechargeable battery;

a secondary coil disposed in said gap and in close proximity to said bottom face of said casing, said secondary coil having a central axis that is oriented in an elongated direction of said casing; and a control circuit for controlling electric power induced in said secondary coil for charging said rectangular rechargeable battery contained in said casing.

4. A battery pack as claimed in claim 3, wherein said control circuit is positioned in said gap.

5. A battery pack comprising:

a rectangular casing having a bottom face;

at least one rectangular rechargeable battery disposed within said casing, said rechargeable battery being sized so that a peripheral gap is defined between the periphery of said battery and an inner peripheral surface of said casing and a lower gap is defined between a lower surface of said battery and the bottom face of said casing;

a secondary coil disposed in said peripheral gap around a lower portion of said battery, said second coil extending below said rechargeable battery in close proximity to said bottom face of said casing, and said secondary coil having a central axis that is oriented in an elongated direction of said casing; and a control circuit disposed in said casing for controlling electric power induced in said secondary coil for charging said rechargeable battery contained in said casing.

6. A battery pack as claimed in claim 5, wherein said control circuit is located inside of said secondary coil and in said lower gap.

7. A combination of a battery pack and a charging stand for charging said battery pack, wherein:

a) said battery pack comprises:

an elongated rectangular casing having a bottom face;

at least one rectangular rechargeable battery disposed in said casing, wherein a width of said casing is greater than a width of said rectangular rechargeable battery such that a gap is defined between a side face of said casing and an opposing side face of said rectangular rechargeable battery;

a secondary coil located in said gap in close proximity to the bottom face of said casing, said secondary coil having a central axis which is oriented in the same direction as a longitudinal direction of said casing; and a control circuit for controlling electric power induced in said secondary coil for charging said rectangular rechargeable battery, and b) said charging stand comprises:

a charging stand case; and a primary coil positioned in said charging stand case so as to be close to said secondary coil when said battery pack is placed in said charging stand, wherein said primary coil is excitable by alternating current so as to induce alternating current in said secondary coil due to electromagnetic induction.

8. The combination as claimed in claim 7, wherein said control circuit is disposed in said gap adjacent said secondary coil.

9. The combination as claimed in claim 7, wherein said casing includes locking projections for detachably connecting said battery pack to a portable electronic device.

10. The combination as claimed in claim 7, wherein said battery pack can be removably attached to said charging stand via a portable electrical device.

11. The combination as claimed in claim 7, wherein said battery pack can be directly attached to said charging stand in order to charge said rechargeable battery contained within said battery pack.

12. The combination as claimed in claim 7, wherein said battery pack is adapted to be removably attached to a portable electrical device includes one of a mobile telephone, an electric shaver, and an electric toothbrush.

13. A combination of a battery pack and a charging stand, wherein:

a) said battery pack comprises:

an elongated rectangular casing having a bottom face and a length;

at least one rectangular rechargeable battery disposed in said casing, wherein the length of said casing is greater than a length of said rectangular rechargeable battery such that a gap is defined between the bottom face of said casing and an opposing lower face of said rectangular rechargeable battery;

a secondary coil located in said gap in close proximity to the bottom face of said casing, said secondary coil having a central axis which is oriented in the same direction as a longitudinal direction of said casing; and a control circuit for controlling electric power induced in said secondary coil for charging said rectangular rechargeable battery, and b) said charging stand comprises:

a charging stand case; and a primary coil positioned in said charging stand case so as to be close to said secondary coil when said battery pack is placed in said charging stand, wherein said primary coil is excitable by alternating current so as to induce alternating current in said secondary coil due to electromagnetic induction.

14. The combination as claimed in claim 13, wherein said control circuit is disposed in said gap adjacent to said secondary coil.

15. A combination of a battery pack and a charging stand, wherein:

a) said battery pack comprises:
- an elongated rectangular casing having a bottom face and a length;
- at least one rectangular rechargeable battery disposed in said casing, said battery being sized so that a peripheral gap is defined about the periphery of said battery and an inner peripheral surface of said casing, and a lower gap is defined between a lower surface of said battery and the bottom face of said casing;
- a secondary coil surrounding a lower portion of said battery and being located in said peripheral gap in close proximity to the bottom face of said casing, said secondary coil having a central axis which is oriented in the same direction as a longitudinal direction of said casing; and
- a control circuit for controlling electric power induced in said secondary coil for charging said rectangular rechargeable battery, and b) said charging stand comprises:
- a charging stand case; and
- a primary coil positioned in said charging stand case so as to be close to said secondary coil when said battery pack is placed in said charging stand, wherein said primary coil is excitable by alternating current so as to induce alternating current in said secondary coil due to electromagnetic induction.

\* \* \* \* \*